United States Patent
Vaidyanathan et al.

(10) Patent No.: US 11,921,788 B2
(45) Date of Patent: *Mar. 5, 2024

(54) REGISTRATION FOR SYSTEM LEVEL SEARCH USER INTERFACE

(71) Applicant: Microsoft Technology Licensing, LLC, Redmond, WA (US)

(72) Inventors: Priya Vaidyanathan, Clyde Hill, WA (US); Brian E. Uphoff, Seattle, WA (US); Brandon H. Paddock, Seattle, WA (US); Stephanie M. Monk, Redmond, WA (US); Dona Sarkar, Kirkland, WA (US); Wentao Chen, Sammamish, WA (US); Edward Boyle Averett, Kirkland, WA (US); Manav Mishra, Kirkland, WA (US); Derek S. Gebhard, Seattle, WA (US); Richard Jacob White, Seattle, WA (US); Yin Liu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/071,104

(22) Filed: Nov. 29, 2022

(65) Prior Publication Data

US 2023/0092016 A1 Mar. 23, 2023

Related U.S. Application Data

(63) Continuation of application No. 16/036,741, filed on Jul. 16, 2018, now Pat. No. 11,625,435, which is a continuation of application No. 12/947,486, filed on Nov. 16, 2010, now Pat. No. 10,073,927.

(51) Int. Cl.
*G06F 16/903* (2019.01)

(52) U.S. Cl.
CPC ................................ *G06F 16/903* (2019.01)

(58) Field of Classification Search
None
See application file for complete search history.

(56) References Cited

U.S. PATENT DOCUMENTS

| | | | | |
|---|---|---|---|---|
| 8,392,435 B1 * | 3/2013 | Yamauchi | ......... | G06F 16/90324 707/768 |
| 9,589,032 B1 * | 3/2017 | Brinck | .............. | G06F 16/90324 |
| 2003/0126117 A1 * | 7/2003 | Megiddo | ............... | G06F 16/951 |
| 2006/0136378 A1 * | 6/2006 | Martin | ................ | G06F 16/9535 |
| 2008/0222569 A1 * | 9/2008 | Champion | .............. | G06F 16/35 |
| 2008/0250012 A1 * | 10/2008 | Hinckley | ............... | G06F 16/951 707/999.005 |
| 2010/0005443 A1 * | 1/2010 | Kwok | ................... | G06F 16/903 |
| 2010/0057702 A1 * | 3/2010 | Ghosh | ................. | G06F 16/2228 707/E17.135 |

(Continued)

*Primary Examiner* — Son T Hoang
(74) *Attorney, Agent, or Firm* — Rainier Patents, P.S.

(57) ABSTRACT

A system level search module receives system level search user interface registration information for an application of the computing device. The registration information includes an indication of how the system level search module can launch the application. The registration information is added to a registration store, and the application is included as one of one or more applications that can be searched using the system level search user interface.

20 Claims, 13 Drawing Sheets

(56) References Cited

U.S. PATENT DOCUMENTS

| | | | |
|---|---|---|---|
| 2010/0076991 A1* | 3/2010 | Nakano | G06F 16/951 |
| | | | 707/E17.074 |
| 2010/0161594 A1* | 6/2010 | Prasad | G06F 16/90335 |
| | | | 707/E17.014 |
| 2010/0306191 A1* | 12/2010 | LeBeau | G06F 16/24578 |
| | | | 707/723 |
| 2011/0307461 A1* | 12/2011 | Borton | G06F 16/951 |
| | | | 707/706 |
| 2011/0314004 A1* | 12/2011 | Mehta | G06F 16/40 |
| | | | 707/723 |
| 2012/0084312 A1* | 4/2012 | Jenson | G06F 16/90324 |
| | | | 707/E17.014 |

* cited by examiner

REGISTRATION FOR SYSTEM LEVEL SEARCH USER INTERFACE

RELATED APPLICATIONS

This application is a continuation of and claims priority to U.S. patent application Ser. No. 12/947,486, filed Nov. 16, 2010, the disclosure of which is incorporated by reference herein in its entirety.

BACKGROUND

As computers have become increasingly commonplace, the amount of electronic data that has become available to users has grown tremendously. While having access to such large amounts of electronic data can be very beneficial to users, it is not without its problems. One such problem is that it remains difficult for users to find the particular electronic data that they are looking for. For example, users can encounter situations where they are accessing multiple different applications in order to find the particular electronic data they are looking for. This typically involves users requesting the different applications be executed, navigating to the search interfaces of the different applications, and entering the same search terms into each of the different applications. This can result in a cumbersome and frustrating experience for the user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a system level search module receives system level search user interface registration information for an application of the computing device. The registration information is added to a registration store, and the application is included as one of one or more applications that can be searched using the system level search user interface.

In accordance with one or more aspects, system level search user interface registration information for an application is identified, the registration information including an indication of how a system level search module providing the system level search user interface can launch the application. The system level search user interface registration information is communicated to the system level search module so that the application is included as one of one or more applications that can be searched using the system level search user interface.

In accordance with one or more aspects, multiple applications of a computing device that can be searched via a system level search user interface are identified. A ranking for each of the multiple applications is generated, the ranking of each of the multiple applications being based at least in part on whether the application is assigned to a same category of applications as a currently active application of the computing device. The ranking of each of the multiple applications is also based at least in part on one or both of how frequently the application is selected as an application to be searched via the system level search user interface and how recently the application was selected as an application to be searched via the system level search user interface. One or more of the multiple applications are selected to be identified via the system level search user interface, each of the selected ones of the multiple applications having a ranking higher than ones of the multiple applications that are not selected. Identifiers of the selected ones of the multiple applications are displayed, as part of the system level search user interface, in an order from highest ranking to lowest ranking.

BRIEF DESCRIPTION OF THE DRAWINGS

The same numbers are used throughout the drawings to reference like features.

DETAILED DESCRIPTION

Registration for system level search user interface is discussed herein. The system level search user interface (UI) provides a centralized UI that allows users to enter a search term and search for that search term in multiple different applications. The particular applications that a user can search using the system level search UI register with the system level search UI, providing various information regarding the applications. The system level search UI uses this registration information to determine how these different applications are to be identified to the user, how the applications are to be launched into their search results display view, and so forth. The system level search UI determines a ranking for the different applications based on various criteria, and displays identifiers of the applications in accordance with this ranking. The user can then select one or more of these different applications to be searched for the search term, in response to which the system level search UI provides the search term to the selected application, and the selected application in turn displays its search results.

Figure 1:
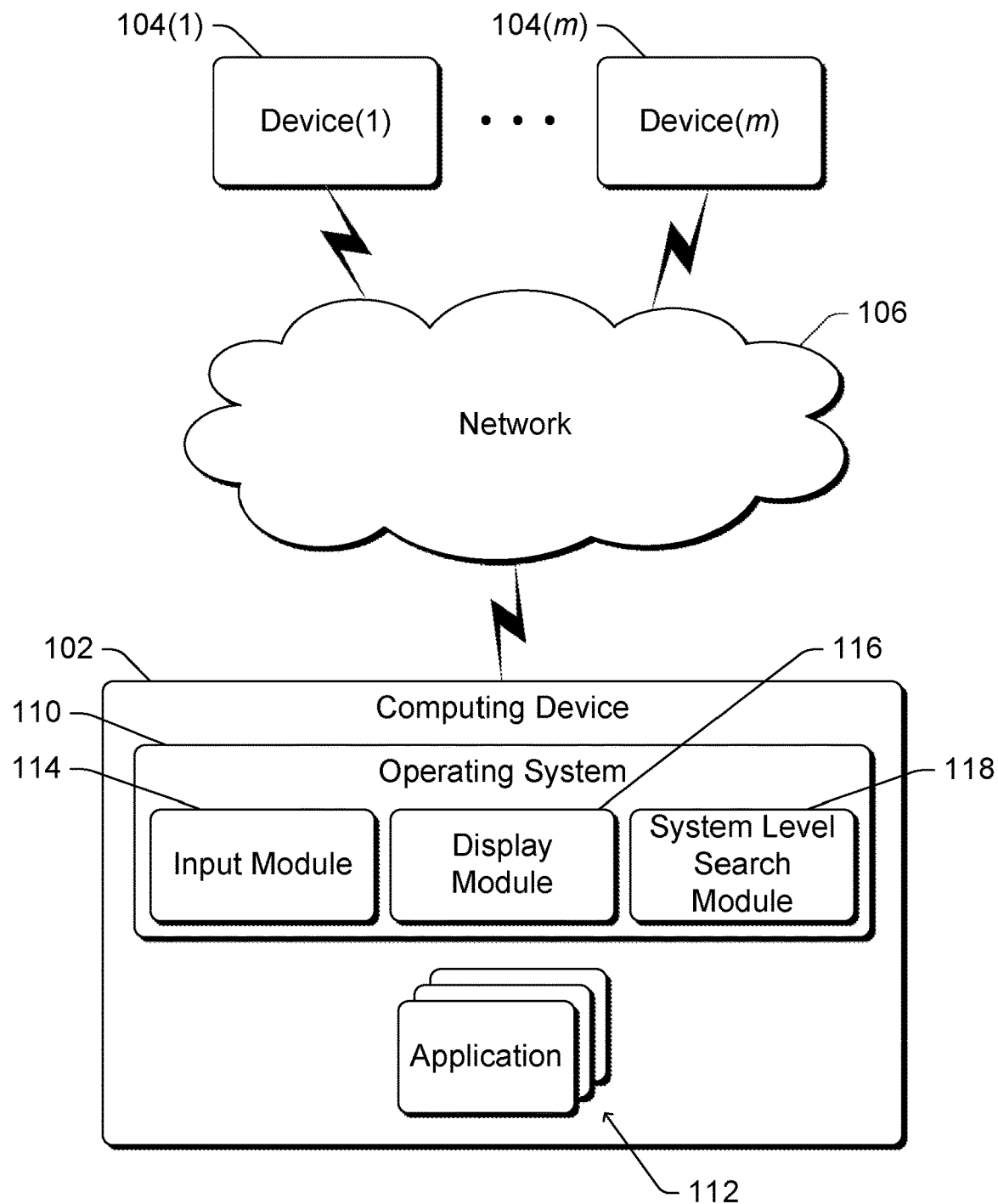
FIG. 1 illustrates an example system implementing the registration for system level search user interface in accordance with one or more embodiments.

FIG. 1 illustrates an example system 100 implementing the registration for system level search user interface in accordance with one or more embodiments. System 100 includes a computing device 102 that can optionally communicate with one or more (x) other devices 104(1), ..., 104(m) via a network 106. Network 106 can be a variety of different networks, including the Internet, a local area network (LAN), a public telephone or other phone network, an intranet, other public and/or proprietary networks, combinations thereof, and so forth. Computing device 102 can be a variety of different types of devices. For example, computing device 102 can be a desktop computer, a notepad or tablet computer, a netbook or laptop computer, a server computer, a mobile station, an entertainment appliance, a set-top box communicatively coupled to a display device, a television, a cellular or other wireless phone, a game console, an automotive computer, and so forth. Additionally, although illustrated as a single device 102, it should be noted that the components or modules of computing device 102 can be implemented as a system of multiple devices, with the components or modules being distributed across the different devices in the system.

Devices 104 can be a variety of different computing devices capable of communicating with computing device 102. Computing device 102 can optionally access one or more of devices 104 to obtain various information, as discussed in more detail below. Similar to the discussion of computing device 102, devices 104 can be a variety of different types of devices. Devices 104 can be the same type or alternatively different types of devices as computing device 102. In system 100, computing device 102 is illustrated as communicating with devices 104 via network 106. Alternatively, computing device 102 can communicate with devices 104 via other types of communication mechanisms or connections, such as various wired and/or wireless connections (e.g., universal serial bus (USB) connections, wireless USB connections, Bluetooth connections, IEEE 1394 connections, and so forth).

Computing device 102 includes an operating system 110 and one or more applications 112. Operating system 110 manages the launching and running of applications 112 on computing device 102. Each of applications 112 can be a variety of different types of applications, such as productivity applications (e.g., email applications, word processing applications, spreadsheet applications, database applications, etc.), entertainment applications (e.g., game applications, audio and/or video playback applications, etc.), social networking applications, and so forth. An application 112 can access data locally, accessing data on computing device 102 (or on storage devices coupled to computing device 102) rather than accessing data on a device 104 via network 106. For example, an application 112 can be a word processing application that accesses data locally. In addition to, or alternatively in place of, accessing data locally, an application can access data on one or more devices 104 via network 106. For example, an application 112 can be an interface application for a device 104 that provides a movie service, allowing a user of computing device 102 to access movies from device 104 via that application 112.

Operating system 110 includes an input module 114, a display module 116, and a system level search module 118. Operating system 110 is typically implemented in software and/or firmware, although at least parts of operating system 110 can alternatively be implemented in hardware.

Input module 114 receives user inputs from a user of computing device 102. User inputs can be provided in a variety of different manners, such as by pressing one or more keys of a keypad or keyboard of device 102, pressing one or more keys of a controller (e.g., remote control device, mouse, trackpad, etc.) of device 102, pressing a particular portion of a touchpad or touchscreen of device 102, making a particular gesture on a touchpad or touchscreen of device 102, and/or making a particular gesture on a controller (e.g., remote control device, mouse, trackpad, etc.) of device 102. User inputs can also be provided via other physical feedback input to device 102, such as tapping any portion of device 102, an action that can be recognized by a motion detection component of device 102 (such as shaking device 102, rotating device 102, etc.), and so forth. User inputs can also be provided in other manners, such as via audible inputs to a microphone, via motions of hands or other body parts observed by an image capture device, and so forth. These user inputs allow a user to interact with computing device 102, such as by inputting particular characters or symbols, selecting particular buttons or menu options, dragging and dropping various descriptions or images, and so forth.

Display module 116 generates, manages, and/or outputs a display for a screen of computing device 102. This display can include various information, such as information provided by applications 112, information provided by system level search module 118 or other modules of operating system 110, and so forth. The information displayed to the user can include user inputs can be received by input module 114. The screen on which display module 116 displays information can be implemented in a variety of different manners, such as using liquid crystal display (LCD) technology, plasma screen technology, image projection technology, and so forth. The screen can be included as part of computing device 102, or alternatively display module 116 can generate one or more signals that are output to one or more other display devices that include one or more screens. Although the discussions herein refer to displaying information on one or more screens, it is to be appreciated that information can alternatively be presented to users by display module 116 in other manners, such as audibly.

System level search module 118 provides a system level search UI, which is a centralized UI that allows users of computing device 102 to enter a search term and search for that search term in different applications 112. The search term can be any combination of letters, characters, symbols, and so forth, such as one or more words, a portion of a word, and so forth. The system level search UI includes a data entry portion via which the user can input the search term, and an application identification portion via which different ones of applications 112 can be identified. The particular ones of applications 112 that are identified in the application identification portion are those applications 112 that have registered with system level search module 118, as discussed in more detail below.

The system level search UI provided by system level search module 118 allows the user of computing device 102 to input his or her desired search term once in the centralized UI, and then select one or more different applications 112 to search for that search term. In response to selecting an application 112 via the system level search UI, the search term is provided to the selected application 112, which in turn determines and displays (via display module 116) search results based on that search term. The user can have different applications 112 search for that same search term simply by selecting the applications via the system level search UI. Thus, rather than the user interacting with operating system 110 to request execution of different applications 112, navigating to a search interface of each of those different applications 112, and entering the same search term into each of those different applications, the user can enter the search term a single time into the system level search UI. The user can then select (e.g., via a single user input such as a keystroke, tapping an application identifier on a touchscreen, clicking on an application identifier when a pointer or other cursor is over the application identifier, etc.) one or more of the applications 112, relying on operating system 110 to automatically execute those applications 112 when selected, and relying on system level search module 118 to provide the search term to the selected applications 112.

The system level search UI can be activated at different times. When the system level search UI is activated, the system level search UI is displayed by display module 116. System level search module 118 can keep the system level search UI activated and constantly displayed. Alternatively, system level search module 118 can activate the system level search UI in response to a particular request (e.g., a user request to perform a search, a request from an application 112 to perform a search, and so forth), keeping the system level search UI hidden until activated. Applications 112 can leverage the system level search UI, invoking system level search module 118 or directing the user to the system level search UI already displayed by module 118. Applications 112 need not provide their own search user interfaces, as they can rely on the system level search UI.

Thus, it should be noted that the system level search UI can be used in different manners. A user can enter a search term into the system level search UI and then select, via the system level search UI, one or more applications 112 to search for that search term. Alternatively, a user can enter a request via an application 112 to enter a search term. In response, the system level search UI can be displayed (or the user can be directed to the system level search UI that is already displayed), via which the user can enter his or her search term to search that application 112. Alternatively, a user can select one or more applications 112 without entering a search term. in response to which the selected application is notified of the user selection and the selected application displays its search results display view. Search results may not be displayed by the selected application yet because the user has not yet entered a search term. However, after entry of a search term, the selected application would display its search results.

Figure 2:
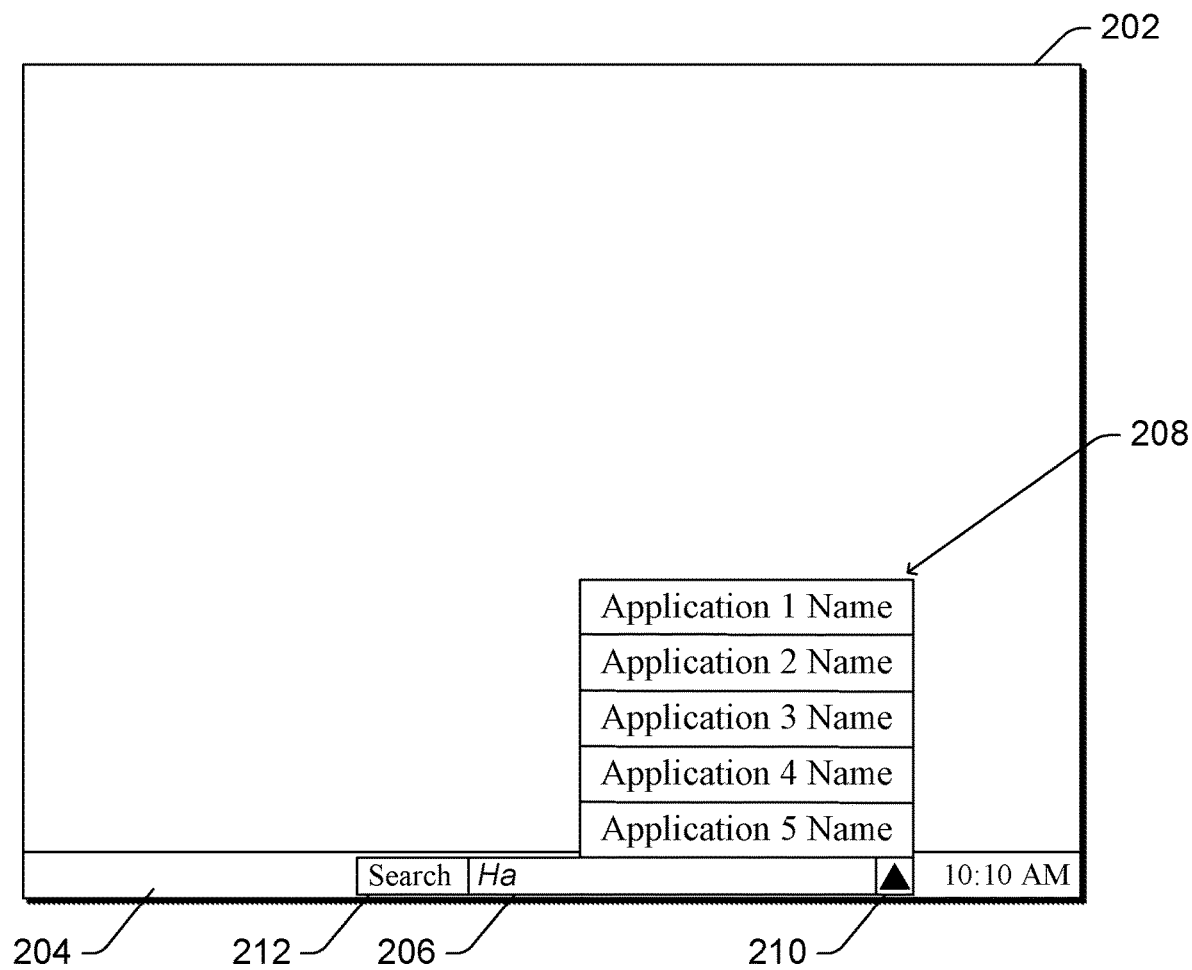
FIGS. 2, 3, 4, 5, and 6 illustrate example screen displays including a system level search user interface in accordance with one or more embodiments.

FIG. 2 illustrates an example screen display 202 including a system level search user interface in accordance with one or more embodiments. Screen display 202 includes a toolbar (or taskbar) 204. Toolbar 204 can include a variety of different information, such as the current time (illustrated as 10:10 AM).

The system level search UI is illustrated including two portions: a data entry portion 206 and an application identification portion 208. The user can enter various words, letters, symbols, characters, and so forth as search terms (e.g., via input module 114 of FIG. 1 as discussed above). This user input is displayed in data entry portion 206. In the illustrated example, the user has entered the characters "Ha". At the point in time that screen display 202 illustrates, "Ha" is the search term. However, it should be noted that the user can continue to enter additional characters, resulting in different search terms.

An application identification portion 208 includes identifiers of different applications. These identifiers are illustrated in example display 202 as "Application 1 Name", "Application 2 Name", "Application 3 Name", "Application 4 Name", and "Application 5 Name". Each of these identifiers in application identification portion 208 is an application that the user can select to have search for the search term displayed in data entry portion 206. The user can select one of the applications identified in application identification portion 208 in a variety of different manners (e.g., via input module 114 of FIG. 1), such as touching an identifier of an application with a stylus or finger, maneuvering a pointer over the identifier of an application and pressing a button of a cursor control device (e.g., a mouse), and so forth.

Application identification portion 208 can be displayed automatically when the user is entering data into data entry portion 206, or alternatively can be displayed in response to a user request to display application identification portion 208. For example, a user can select a menu icon 210 in a variety of different manners (e.g., via input module 114 of FIG. 1), such as by touching menu icon 210 with a stylus or finger, maneuvering a pointer over menu icon 210 and pressing a button of a cursor control device (e.g., a mouse), pressing a particular key of a keyboard, and so forth. In response to user selection of menu icon 210, application identification portion 208 is displayed.

Additionally, the system level search UI can include a search button 212 that can be selected in a variety of different manners (e.g., via input module 114 of FIG. 1), analogous to selection of menu icon 210. In response to user selection of search button 212, the search term currently entered in data entry portion 206 is sent to an application for searching. The application to which the search term is sent can be determined in different manners, such as being the currently active application, an application in application identification portion 208 that is currently highlighted, an application listed at the top of application identification portion 208, and so forth. The currently active application refers to the application (e.g., one of applications 112 of FIG. 1 (an application other than the operating system)) that is currently running in the foreground and is the application that the user can interact with. Although multiple applications can be running concurrently on a computing device, only one is the currently active application. Application identification portion 208 does not typically include the currently active application, although alternatively can include the currently active application.

It should be noted that the locations of data entry portion 206 and application identification portion 208 of the system level search UI illustrated in the Figures are examples, and that the system level search UI can be displayed anywhere on screen display 202. For example, data entry portion 206 and application identification portion 208 can be displayed at the top of screen display 202, along the left side or right side of screen display 202, in the center of screen display 202, as part of a menu bar, as part of an icon bar or dock, and so forth.

Figure 3:
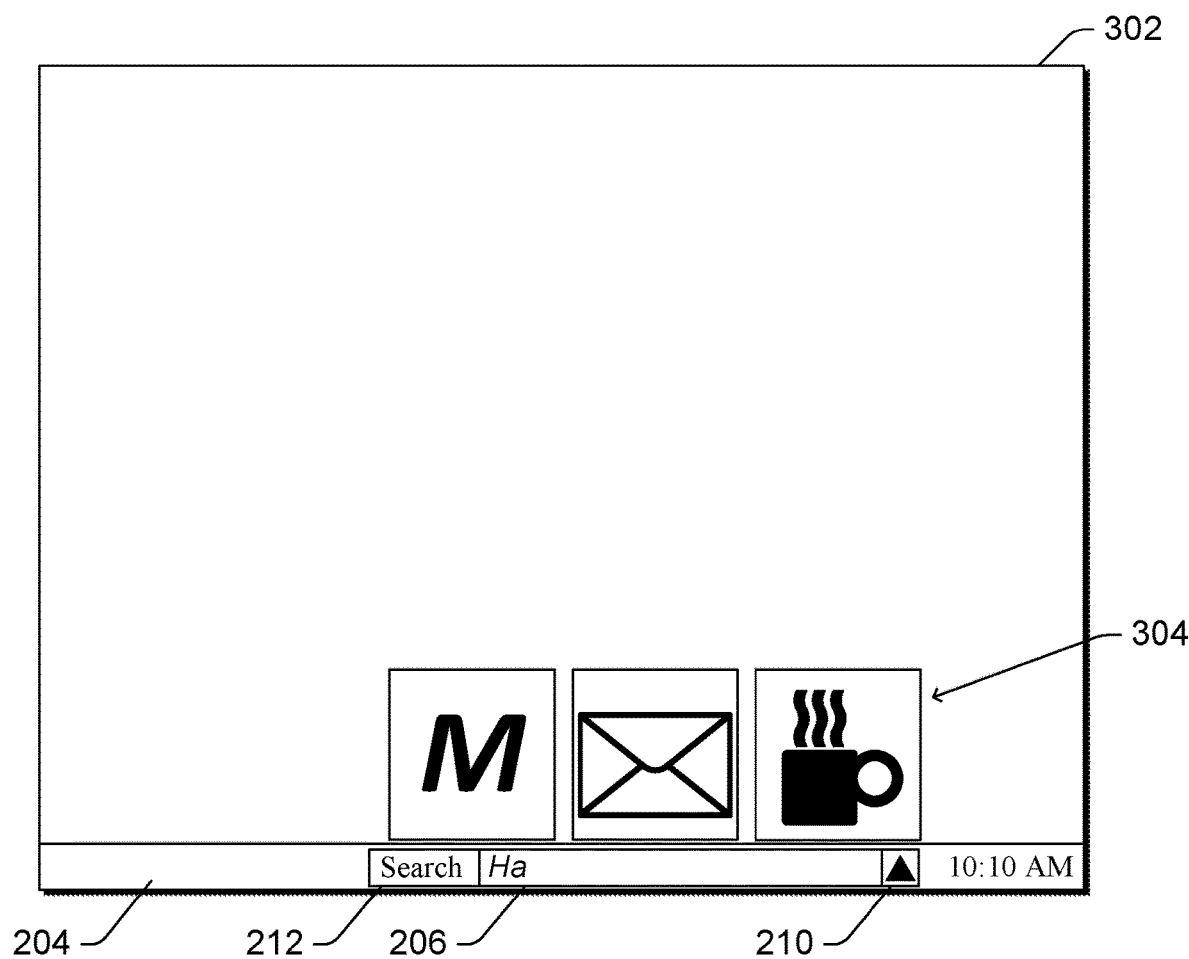

FIG. 3 illustrates another example screen display 302 including a system level search user interface in accordance with one or more embodiments. Screen display 302 is similar to screen display 202 of FIG. 2. However, screen display 302 illustrates application identification portion 304 as including icons or symbols representing applications rather than application names as illustrated in application identification portion 208 of FIG. 2. These icons or symbols can be selected by the user analogous to selection of the application names discussed above with reference to application identification portion 208.

Figure 4:
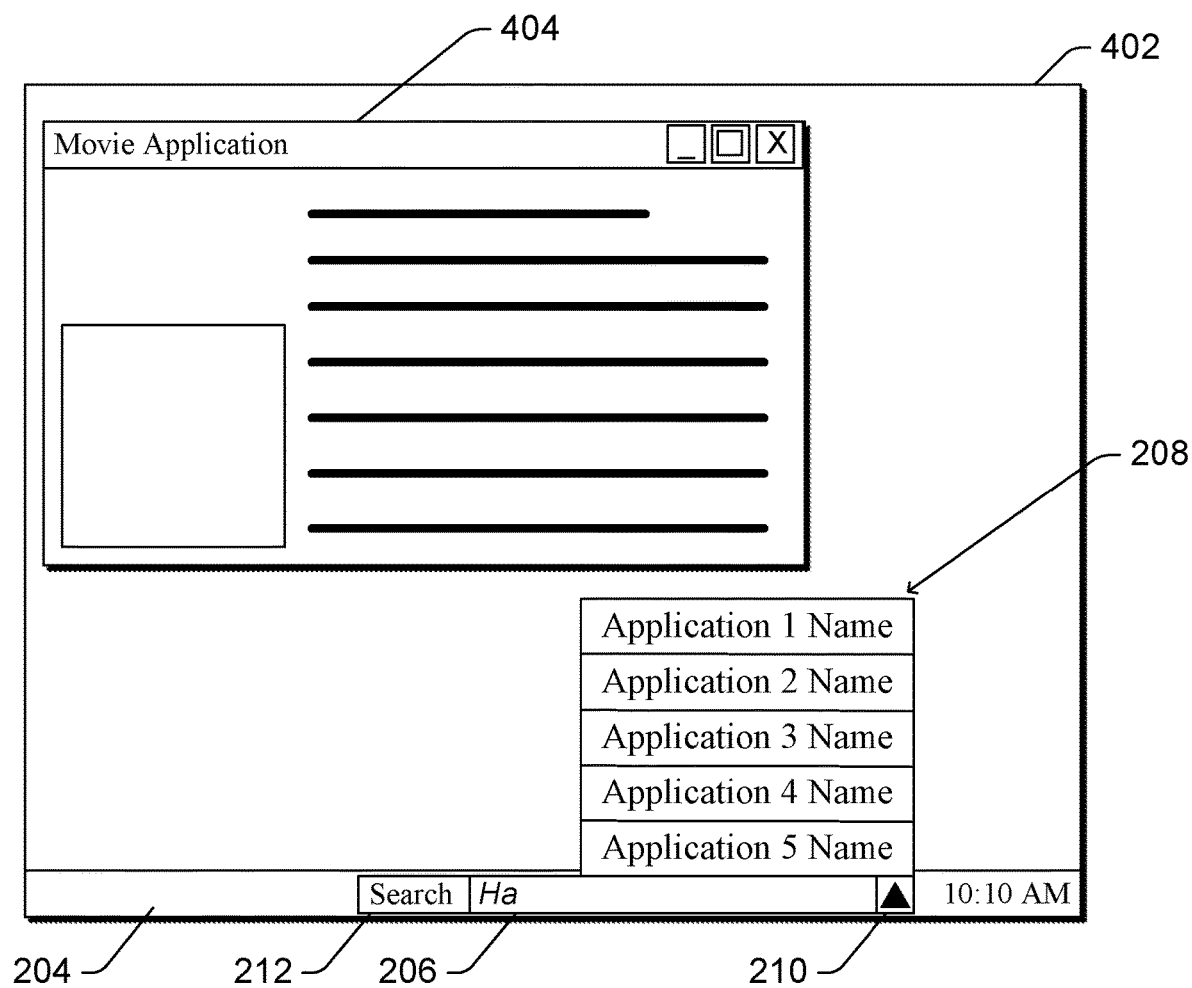

FIG. 4 illustrates another example screen display 402 including a system level search user interface in accordance with one or more embodiments. Screen display 402 is similar to screen display 202 of FIG. 2. However, screen display 402 also displays a window 404 for a currently active application named "Movie Application". Window 404 can display any of a variety of different information, such as text (displayed as horizontal lines in window 404) and images (displayed as a box in window 404).

In one or more embodiments, the applications identified in application identification portion 208 do not include the currently active application displayed in window 404. Alternatively, the applications identified in application identification portion 208 can include the currently active application displayed in window 404.

In one or more embodiments, in response to user selection of search button 212, the search term currently entered in data entry portion 206 ("Ha" in the illustrated example) is sent to the currently active application. If the user were to select search button 212, then in response the search term currently entered in data entry portion 206 is sent to the application displayed in window 404. If the user were to select one of the applications identified in application identification portion 208 rather than search button 212, then in response the search term currently entered in data entry portion 206 is sent to the selected application.

Figure 5:
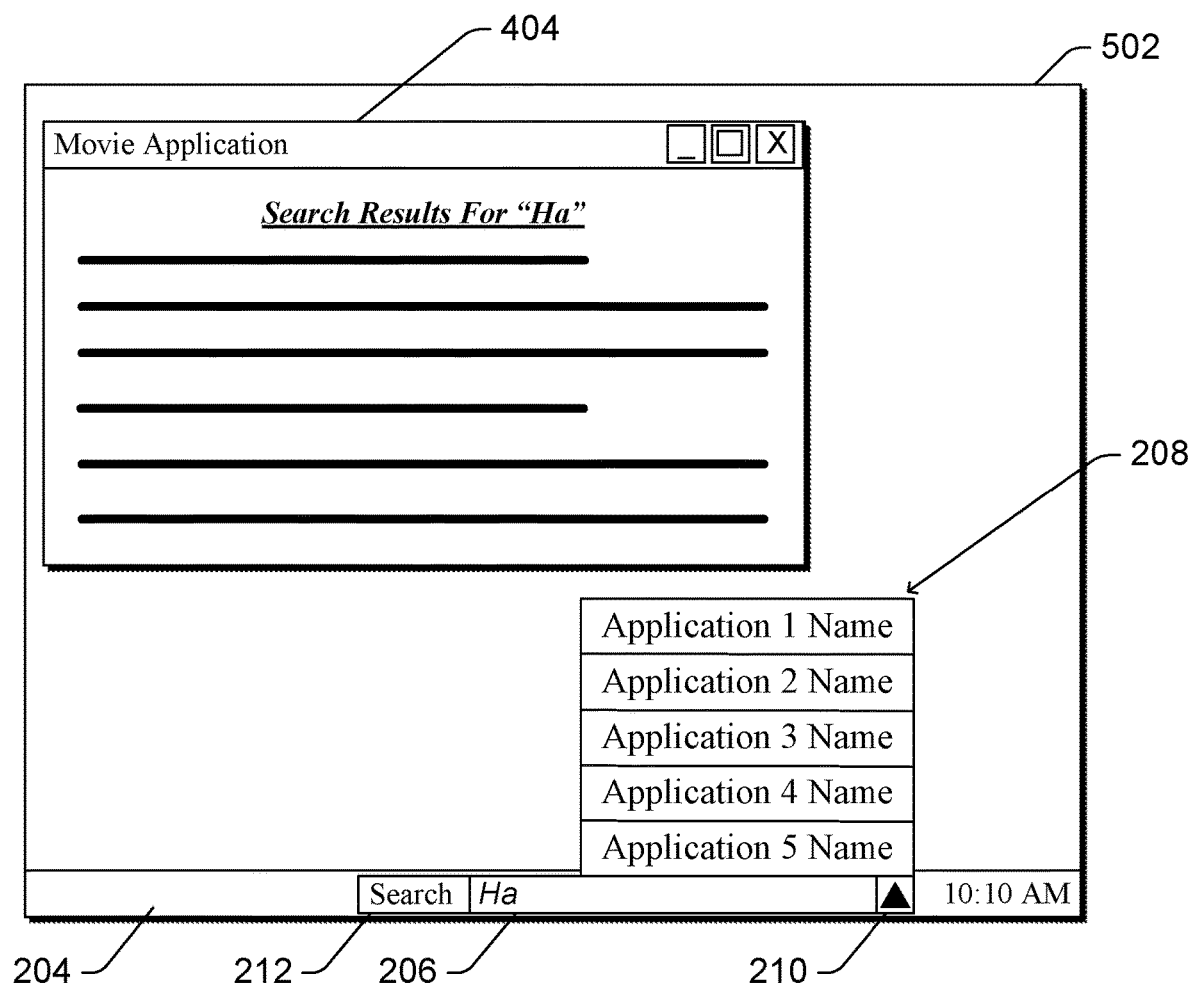

FIG. 5 illustrates another example screen display 502 including a system level search user interface in accordance with one or more embodiments. Screen display 502 is similar to screen display 402 of FIG. 2, displaying a window 404 for a currently active application named "Movie Application". However, screen display 502 illustrates window 404 after the search term has been sent to the currently active application. Window 404 can display any of a variety of different information as search results, such as text (displayed as horizontal lines in window 404) and images.

As can be seen in the example screen display 502, search results are displayed by the application selected to search for the search term. Additionally, data entry portion 206 and application identification portion 208 remain displayed on screen display 502.

Figure 6:
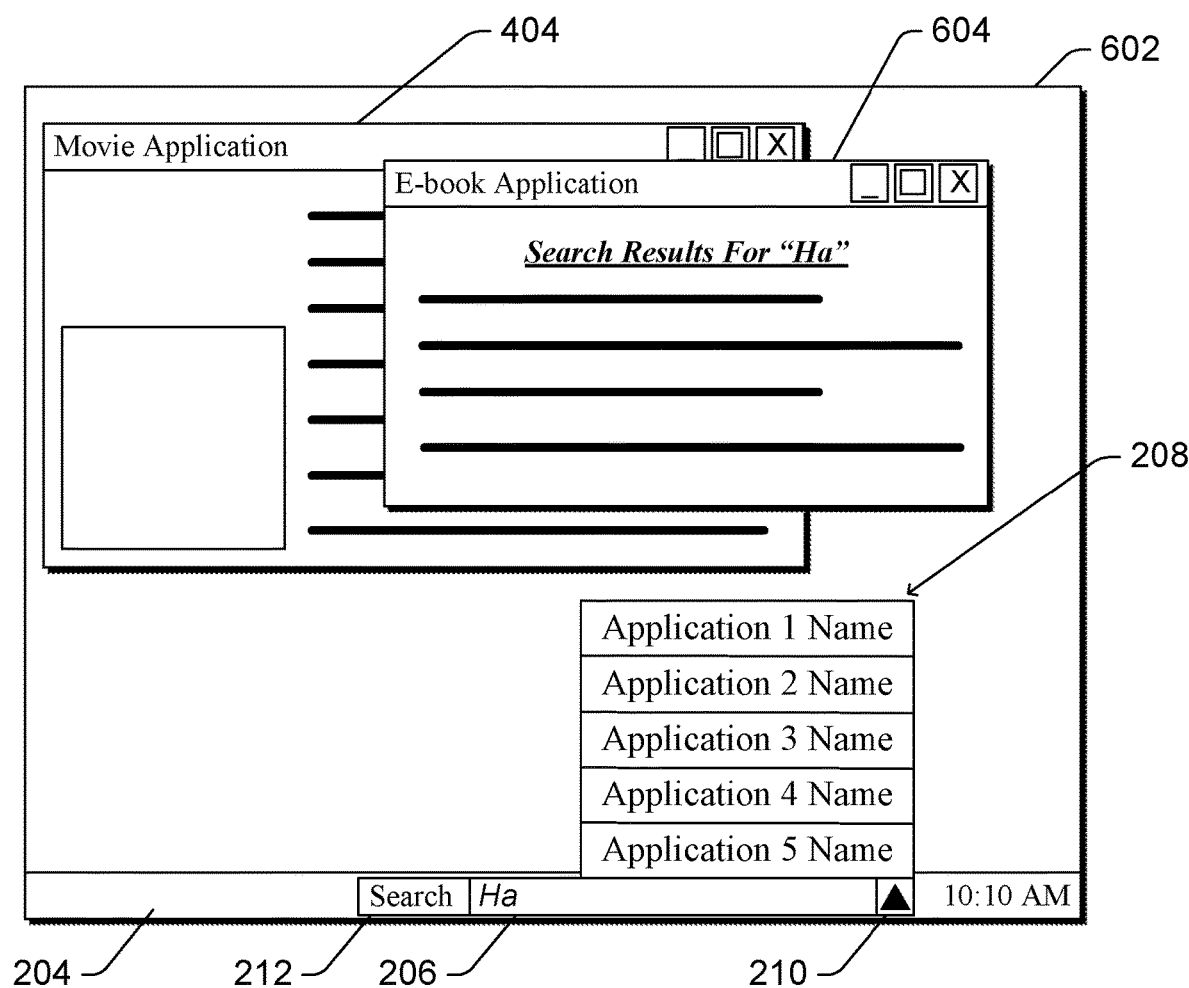

FIG. 6 illustrates another example screen display 602 including a system level search user interface in accordance with one or more embodiments. Screen display 602 is similar to screen display 402 of FIG. 2, displaying a window 404 for an application named "Movie Application". However, screen display 602 also illustrates a window 604 including search results from an application other than the application displayed in window 404. Window 604 is displayed after an application identified in application identification portion 208 has been selected. Assume, for example, that "Application 3 Name" identifies an electronic book (E-book) reader application. In response to user selection of the "Application 3 Name", the search term currently entered in data entry portion 206 ("Ha" in the illustrated example) is sent to the selected application. The selected application is launched (if not already running), searches for the search term "Ha", and generates the information to be displayed in window 604 as the search results. Window 604 can display any of a variety of different information as search results, such as text (displayed as horizontal lines in window 604) and images.

In the example screen display 602, the application generating the information for display in window 604 is the currently active application. Window 404, which displays information for the application that was previously the currently active application, remains displayed. Alternatively, in response to user selection of the "Application 3 Name" in portion 208, or in response to launching of the selected application, window 404 can be closed (e.g., and the application displaying information in window 404 shut down) or have its appearance altered (e.g., no longer displayed, reduced to an icon in a taskbar or toolbar).

Figure 7:
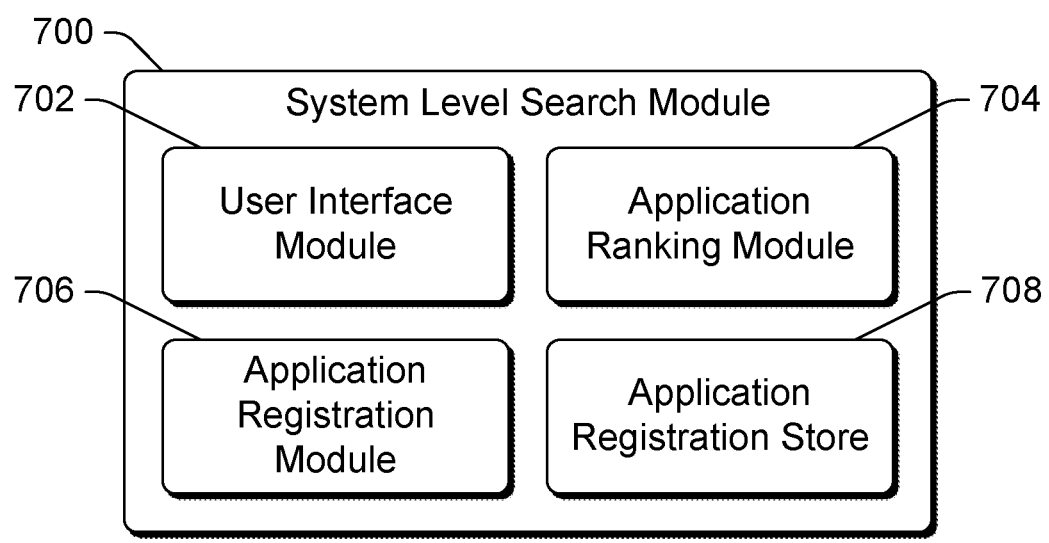
FIG. 7 is a block diagram illustrating an example system level search module in accordance with one or more embodiments.

FIG. 7 is a block diagram illustrating an example system level search module 700 in accordance with one or more embodiments. System level search module 700 can be, for example, a system level search module 118 of FIG. 1. System level search module 700 includes a user interface module 702, an application ranking module 704, an application registration module 706, and an application registration store 708.

Application registration module 706 manages the registration of applications with system level search module 700, allowing the registered applications to be displayed in the application identification portion of the system level search UI. This registration is also referred to as allowing the registered applications to use the system level search UI. Information regarding the registered applications is maintained in application registration store 708. Application ranking module 704 determines a ranking for registered applications, and the registered applications are displayed in the application identification portion of the system level search UI in accordance with their rankings. User interface module 702 generates the information to be displayed as the system level search UI, and provides that information to a display module of the computing device on which system level search module 700 is located (e.g., to display module 116 of FIG. 1). UI module 702 also interacts with applications (e.g., applications 112 of FIG. 1), including launching user-selected applications, communicating search terms to applications, and receiving information from applications to be displayed as part of the system level search UI.

In order to be displayed in the application identification portion of the system level search UI, an application registers with system level search module 700. Application registration module 706 manages the registration process for system level search module 700, communicating with the application and saving the appropriate registration information in application registration store 708. An application can be registered with system level search module 700 at different times, such as when the application is installed on the same computing device as system level search module 700, when an upgrade to an application on the same computing device as system level search module 707 is installed, in response to a request from the user to register with system level search module 700, in response to a request from another module or device to register with system level search module 700, and so forth.

Additionally, the application itself can perform the registration process to register itself with system level search module 700, or alternatively another application or module can perform the registration process to register the application with system level search module 700. For example, an installer application or module can, when installing the application on the computing device that includes system level search module 700, perform the registration process to register the application with system level search module 700.

As part of the registration process, registration information for the application being registered is provided to application registration module 706. Various different registration information can be provided to application registration module 706. In one or more embodiments, the registration information includes an indication of how the application that is being registered is to be launched by UI module 702 and how the search term is to be provided to the application. This indication of how the application is to be launched by UI module 702 can vary by application, and can include, for example, an indication of an executable file to be run, an indication of one or more parameters to be used when beginning running the file or to be passed to the application after it is running, an indication of one or more application programming interfaces (APIs) of the application to invoke in order to pass the application one or more parameters, and so forth. Similarly, the indication of how the search term is to be provided to the application by module 702 can vary by application, and can include, for example, an indication of how the search term (and optionally other context information) is to be provided to the application when beginning running the application, an indication of one or more APIs of the application to invoke in order to pass the application the search term (and optionally other context information), and so forth.

Various other information can be included in the registration information. For example, the registration information can include metadata describing the application, such as a particular application category that the application is classified as (e.g., game, music, movie, publications, shopping, productivity, social networking, and so forth), a particular type of content that the application services (e.g., movies, electronic books, games, music, etc.), a web domain used by the application (e.g., web domain of a device or service accessed over a network), and so forth. By way of another example, the registration information can include information indicating how the application is to be identified in the application identification portion of the system level search UI (e.g., one or more icons to use, one or more names to use, one or more colors or fonts to use, one or more animations to display, and so forth). By way of yet another example, the registration information can include information describing requirements of the application (e.g., whether the application relies on Internet or other network access to another device or service).

It should also be noted that the registration information can be provided by the application being registered, or alternatively by another device, component, or module. For example, at least some of the registration information can be provided by a merchant or manufacturer of the application. By way of another example, the application may have an associated manifest or other metadata that includes the registration information, and an installer application or module that is installing the application can provide the registration information on behalf of the application.

Application registration module 706 stores the registration information received as part of the registration process for an application in application registration store 708. The registration information is stored as being associated with or corresponding to the application, such as by storing the registration information with a corresponding application identifier. The application identifier can take a variety of different forms, such as a combination of application name and manufacturer, an identifier assigned to the application by the application manufacturer or by system level search module 700, and so forth. Application registration store 708 can be a database, list, or other data structure storing registration information for different applications. Application registration store 708 can be subsequently accessed by user interface module 702 to identify applications that are to be displayed as part of the application identification portion of the system level search UI.

Application ranking module 704 assigns a ranking to each application registered in application registration store 708. This ranking is used to determine an order in which applications are displayed in the application identification portion of the system level search UI. Furthermore, situations can arise where there are more applications that have registered with system level search module 700 than can be displayed by the system level search UI. In such situations, the ranking is used to determine which applications are to be displayed by the system level search UI. Alternatively, the order in which applications are displayed and/or which applications are displayed can be determined in different manners, such as alphabetically by application name, randomly, according to other rules or criteria, and so forth.

Application ranking module 704 can use a variety of different criteria in ranking applications, such as metadata describing the applications (and included as registration information of the applications) and usage data for the applications. Application ranking module 704 can determine rankings in response to different events, such as the system level search UI being activated, a user request to display the application identification portion of the system level search UI (e.g., by selecting menu icon 210 of FIG. 2), a search term being entered by the user, and so forth. Alternatively, application ranking module 704 can pre-determine the rankings of the applications and use the pre-determined rankings when the application identification portion of the system level search UI is being displayed. The pre-determined rankings can be generated at regular or irregular intervals (e.g., approximately daily or weekly, when a new application registers with application registration module 706, and so forth). These pre-determined rankings can be maintained in application registration store 708 (e.g., an application ranking can be stored along with the registration information) or alternatively stored elsewhere.

The rankings determined by application ranking module 704 can be a particular score (e.g., a value ranging from 1 to 100), or alternatively can be an ordering of the applications from highest ranking to lowest ranking so that a determination can be readily made as to whether a particular application is ranked higher or lower than any other application. Applications with higher scores or higher rankings are typically deemed as being more relevant to the search term input by the user than applications with lower scores or lower rankings, although alternatively applications with lower scores or lower rankings can be deemed as being more relevant to the search term input by the user than applications with higher scores or higher rankings.

In one or more embodiments, to determine the ranking for a particular application ranking module 704 identifies characteristics of the particular application. Various characteristics of the particular application can be used to determine the ranking for a particular application. Multiple characteristics can be used to determine the ranking for a particular application, or alternatively a single characteristic can be used to determine the ranking for a particular application. A particular relevance score is generated for each of these characteristics being used to determine the ranking, and these relevance scores are input to one or more ranking algorithms. The one or more ranking algorithms combine the input relevance scores (e.g., by adding the scores, by assigning a weight to each of the relevance scores and adding the weighted relevance scores, and so forth) to generate a ranking for the application. The combination of the relevance scores for the application can be the ranking for the application. Alternatively, the combined relevance scores for all of the registered applications can be generated and the registered applications can be ordered based on their combined relevance scores (e.g., from highest combined relevance score to lowest combined relevance score), and this ordering can be the rankings of the applications.

One characteristic that can be used to determine the ranking for an application is metadata describing the application. Metadata describing the application is provided as registration information for the application as discussed above. Application ranking module 704 identifies the application category of the currently active application (e.g., an identifier of the currently active application can be obtained from the operating system and used as a lookup in application registration store 708 to determine registration information for that application). If the application is in the same category as the currently active application, then the application is assigned a higher relevance score (e.g., a value of 1), and if the application is not in the same category as the currently active application then the application is assigned a lower relevance (e.g., a value of 0).

Another characteristic that can be used to determine the ranking for an application is usage data for the application. Information regarding the usage of an application can be monitored and maintained by system level search module 700. As the user selects applications to be searched and search terms using system level search module 700, the information regarding which applications were selected to be searched and the search terms that were input for searching can be readily identified and a record of such maintained by system level search module 700. The information regarding the usage of an application can be, for example, how frequently the application is selected as the application to be searched via the system level search UI, how recently the application was selected as the application to be searched via the system level search UI, how frequently the application is selected as the application to be searched for the current search term via the system level search UI, how recently the application was selected as the application to be searched for the current search term via the system level search UI, and so forth. Additionally, if applications support search user interfaces that can be searched separately from the system level search UI, then those applications can monitor usage data and provide such usage data to application ranking module 704 as well.

The usage information can be used to generate a numeric value that is the relevance score for an application. For example, a numeric value for the frequency with which an application is selected as the application to be searched via the system level search UI can be generated by dividing the number of times that the application is selected by the total number of application selections (e.g., over some time period, such as the previous week, previous month, etc.). By way of another example, a numeric value for how recently the application was selected as the application to be searched for the current search term via the system level search UI can be generated by identifying how long ago (e.g., in minutes, hours, days, etc.) the application was last selected as the application to be searched for the current search term via the system level search UI.

Another characteristic that can be used to determine the ranking for an application is the web domain for the application. The web domain of an application is provided as registration information for the application as discussed above. Application ranking module 704 can forward the current search term entered by the user to an Internet search engine, analyze the results returned by the Internet search engine, and assign the application a relevance score based on where the web domain appeared in the results returned by the Internet search engine. A numeric value that is the relevance score for the application based on the web domain of the application can be generated, for example, by identifying how high or early the web domain is in the results returned by the Internet search engine. For example, if the results returned by the Internet search engine list the web domain of the application as the first result, then the relevance score for the application is 1 (or alternatively a particular value minus 1). By way of another example, if the results returned by the Internet search engine list the web domain of the application as the result fifth from the top or first search result, then the relevance score for the application is 5 (or alternatively a particular value minus 5). Alternatively, if the results returned by the Internet search engine indicate that no results are available that include the web domain, then the application can be excluded from the applications displayed in the application identification portion of the system level search UI. For example, application ranking module 704 can indicate to user interface module 702 that the application is to be excluded, in response to which user interface module 702 does not include an identifier of the application in the application identification portion of the system level search UI. Alternatively, application ranking module 704 can forward the web domain of the application to a web service that returns a relevance score for the application. The manner in which the web service determines the relevance score can vary and is determined by the web service.

In alternate embodiments, application ranking module 704 maintains rankings for applications that are specified by (and can be input in a variety of different manners by) a user. The user is thus able to customize the rankings for the applications as he or she desires. The application ranking module 704 need not use any other criteria to determine the rankings for the applications, and can just use the user-specified rankings as the rankings that are generated or determined by application ranking module 704. These user-specified rankings for applications can be maintained with the other information regarding the registered applications in application registration store 708, or alternatively can be maintained elsewhere.

User interface module 702 uses the information in application registration store 708 and the rankings generated by application ranking module 704 to determine the applications to include in the application identification portion of the system level search UI and/or the ordering of the applications included in the application identification portion of the system level search UI. In one or more embodiments, the application identification portion of the system level search UI can display no more than a threshold number of applications. If more than the threshold number of applications are registered with system level search module 700, then user interface module 702 selects the threshold number of applications that are registered with system level search module 700 and have the highest rankings (or alternatively the lowest rankings). For example, if application identification portion of the system level search UI can display only 5 application identifiers, then user interface module 702 selects the 5 highest ranked applications (e.g., the applications having the 5 largest combined relevance scores, the 5 applications at the beginning or ending of an ordering of applications based on their combined relevance scores, and so forth) and includes identifiers of those 5 highest ranked applications in the application identification portion of the system level search UI. The threshold number of applications can optionally be configured by a user or administrator of system level search module 700.

User interface module 702 can also use the information in application registration store 708 to determine the applications to include in the application identification portion of the system level search UI. In one or more embodiments, the registration information provided by the application includes requirements of the application as discussed above. User interface module 702 checks whether these requirements are satisfied, and does not include the application in the application identification portion of the system level search UI if the requirements are not satisfied.

The manner in which user interface module 702 determines whether the requirements of the application are satisfied varies based on the particular requirements. For example, the registration information can indicate that an Internet connection is required (e.g., to access a data store on a remote computing device, such as a computing device 104 of FIG. 1). User interface module 702 queries a component or module (e.g., of the operating system on the same computing device as system level search module 700) to determine whether the computing device currently has an Internet connection. If the computing device currently has an Internet connection, then the requirement is satisfied and the application can be included in the application identification portion of the system level search UI. However, if the computing device does not currently have an Internet connection, then the requirement is not satisfied and the application is not included in the application identification portion of the system level search UI. Alternatively, if the computing device does not currently have an Internet connection, then the application can be displayed in the application identification portion but with a different appearance (e.g., shadowed out to indicate that the application may not be able to search for the search term) or with text, an icon, or some other indication that the application may not be able to search for the search term.

Additionally, in one or more embodiments user interface module 702 determines the ordering of the applications included in the application identification portion of the system level search UI based on the rankings. The application identifiers are displayed in the application identification portion of the system level search UI in order in accordance with the rankings of the applications. The manner in which the application identifiers are displayed in accordance with their rankings can vary by implementation. For example, application identifiers can be displayed top to bottom in the application identification portion of the system level search UI in order from highest ranking to lowest ranking. E.g., referring to FIG. 2, the application identified by "Application 1 Name" would have a higher ranking than the application identified by "Application 3 Name". By way of another example, application identifiers can be displayed left to right in the application identification portion of the system level search UI in order from highest ranking to lowest ranking. E.g., referring to FIG. 3, the application identified by the envelope would have a higher ranking than the application identified by the coffee cup, and a lower ranking than the application identified by the letter "M".

User interface module 702 can also make various other modifications to the application identifiers based on the rankings. For example, application identifiers for higher ranked applications (e.g., one or more highest ranked applications, applications having rankings above a threshold value, etc.) can be displayed in a different font, in a different color, with animations, in a larger size, and so forth. By way of another example, application identifiers can be displayed in different sizes, with application identifiers of higher ranked applications being larger icons, symbols, font sizes, etc. than application identifiers of lower ranked applications.

Thus, user interface module 702 displays application identifiers in the application identification portion of the system level search UI based on the rankings of the applications. The application identifier that is displayed by user interface module 702 is obtained from application registration store 708 (as provided during the registration process for the application). When a user selects a particular application identifier, user interface module 702 accesses application registration store 708 to identify how to launch the application. User interface module 702 retrieves this information from application registration store 708 and provides the information to the operating system, which in turn launches the selected application. In addition, user interface module 702 provides the search term entered by the user in the data entry portion of the system level search UI to the selected application. The selected application then searches for the search term, and displays the appropriate results. The search term is provided to the selected application in the manner indicated by the selected application in the registration information previously provided by the selected application.

User interface module 702 can also provide various additional context information to the application that is performing the search (which can be the selected application or the currently active application as discussed above). Context information refers to information regarding the user of the computing device and/or the search being requested (the search term itself can be referred to as context information for the search). Context information can include, for example, an identifier of a user of the computing device (e.g., obtained from another component or module of the operating system), an indication that a user is logged into the computing device (e.g., allowing the application itself to identify the user), an indication of the currently active application, an indication of the category of the currently active application, an indication of one or more applications that the user has previously selected to be searched for the search term, an indication of the category of each of one or more applications that the user has previously selected to be searched for the search term, and so forth.

An application that receives the context information for the search can use the context in any manner that the application desires, and can use all of the context information or only some of the context information. For example, an application may use the search term to generate search results, but ignore any other context information for the search. By way of another example, the application may use the search term to generate search results and also categories of applications that the user has previously selected to be searched for the search term to generate search results that include data of the same category (e.g., movie files if the categories of the applications previously searched by the user were movies).

Figure 8:
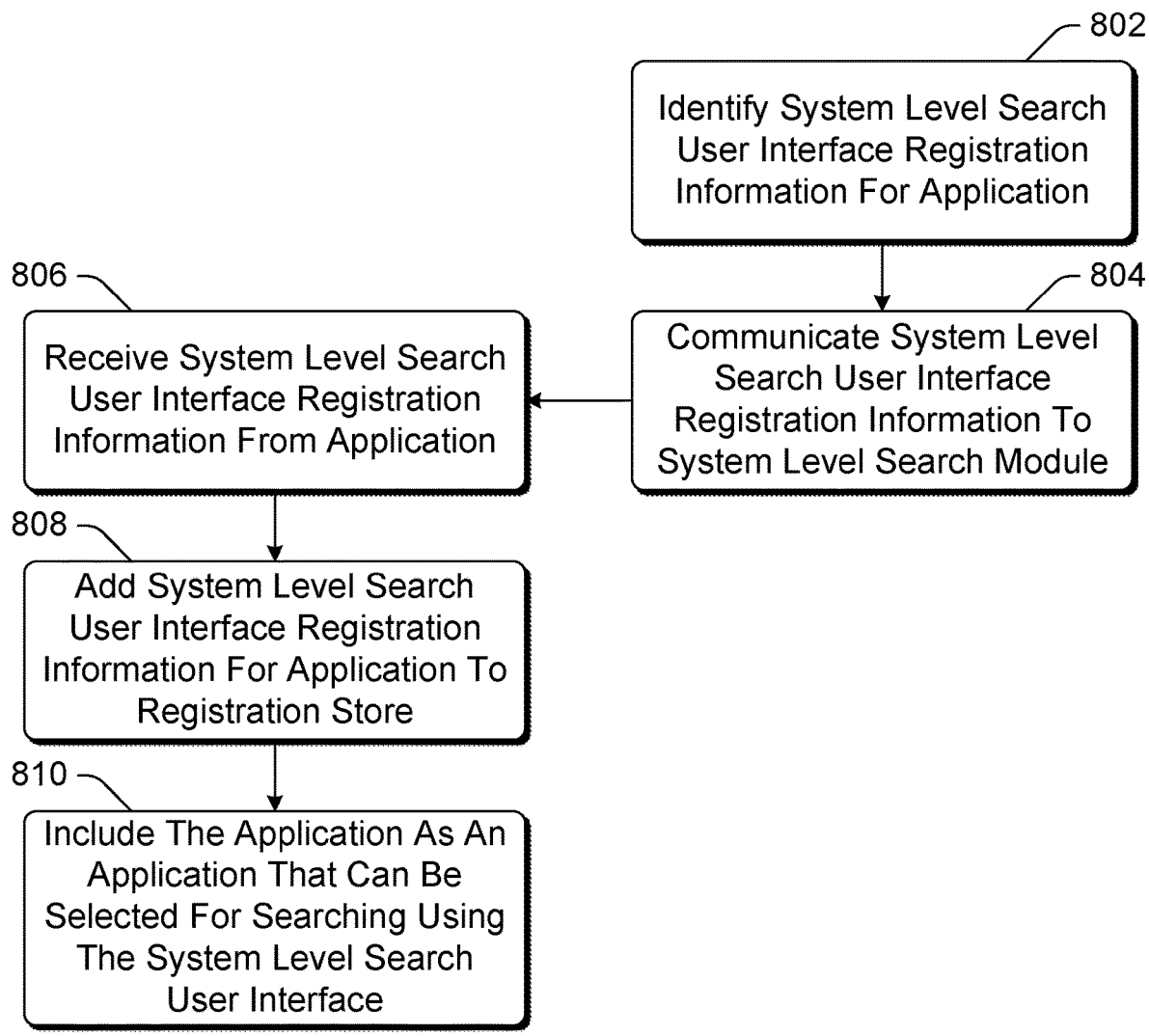
FIG. 8 is a flowchart illustrating an example registration process for registering an application with a system level search module in accordance with one or more embodiments.

FIG. 8 is a flowchart illustrating an example registration process 800 for registering an application with a system level search module in accordance with one or more embodiments. Process 800 can be implemented in software, firmware, hardware, or combinations thereof. Acts of process 800 illustrated on the left-hand side of FIG. 8 are carried out by a system level search module, such as system level search module 700 of FIG. 7. Acts of process 800 illustrated on the right-hand side of FIG. 8 are carried out by and/or behalf of an application, such as an application 112 of FIG. 1. Acts of process 800 illustrated on the right-hand side can be carried out by the application itself, or by another component or module on behalf of the application (e.g., by an application installer, by a merchant or manufacturer of the application, and so forth). Process 800 is shown as a set of acts and is not limited to the order shown for performing the operations of the various acts. Process 800 is an example process for registering an application with a system level search module; additional discussions of registering an application with a system level search module are included herein with reference to different figures.

In process 800, system level search UI registration information for the application is identified (act 802). The system level search UI registration information includes an indication of how the application is to be launched by the system level search module. A variety of additional information can also be identified as system level search UI registration information as discussed above.

The identified system level search UI registration information is communicated to the system level search module (act 804). This registration information can be communicated to an application registration module of the system level search module as discussed above.

The system level search module receives the system level search UI registration information from the application (act 806), and adds the received system level search UI registration information to a registration store (act 808).

The application is included as an application that can be selected for searching using the system level search UI (act 810). An identifier of the application (which can be included in the system level search UI registration information provided by the application) can be displayed to the user, allowing the user to select the application to search for one or more search terms as discussed above.

Returning to FIG. 7, as discussed above user interface module 702 generates the information to be displayed as the system level search UI and also interacts with applications, which can include launching user-selected applications. User interface module 702 can also have additional interactions with the currently active application, providing information to and receiving information from the currently active application. The currently active application refers to the application (e.g., one of applications 112 of FIG. 1) that is currently running in the foreground and is the application that the user can interact with, as discussed above. An indication of the currently active application is maintained by a module of the operating system, and the indication can be obtained by user interface module 702 from this module of the operating system.

It should be noted that the currently active application can change over time in response to user input and/or requests from another application or module running on the computing device. For example, a user can select an application identifier from the application identification portion of the system level search UI, and in response the application corresponding to the selected application identifier becomes the currently active application. By way of another example, separately from the system level search UI the user can select to launch an application or select an application to interact with, and in response the selected application becomes the currently active application.

In one or more embodiments, user interface module 702 provides user input as it is received to the currently active application. Each character or other symbol entered by the user is provided to the currently active application in response to the character or symbol being input. In response to the user input, the currently active application can generate zero or more suggested search terms based on that input. The currently active application can generate the zero or more suggested search terms in a variety of different manners, such as based on previous data input by the user, based on searchable data or a dictionary that is maintained by the application, and so forth. The zero or more suggested search terms are returned to user interface module 702, which displays the suggested search terms as part of the system level search UI. The suggested search terms can be displayed in different locations, such as in a list of menu items adjacent to the data input portion of the system level search UI. The user can select one of the suggested search terms, and in response user interface module 702 displays the suggested search term in the data input portion of the system level search UI.

For example, if a user is entering a search term and the first character entered by the user is the letter "H", user interface module 702 sends the currently active application an indication that the letter "H" has been entered by the user. The currently active application generates zero or more suggested search terms (e.g., Home, House, Hydrogen, Hello, etc.) and returns those suggested search terms to user interface module 702. User interface module 702 displays those suggested search terms as part of the system level search UI. The user can then select one of those suggested search terms as at least part of the user's desired search term in a variety of different manners (e.g., via input module 114 of FIG. 1), such as touching the suggested search term with a stylus or finger, maneuvering a pointer over the suggested search term and pressing a button of a cursor control device (e.g., a mouse), and so forth. In response to a user selection of a suggested search term, user interface module 702 displays the selected suggested search term in the data entry portion of the system level search UI.

Continuing with this example, if the user does not select one of the suggested search terms but instead enters the letter "e", so that the user's input so far is "He", user interface module 702 sends the currently active application an indication that the letters "He" have been entered by the user. The currently active application generates zero or more suggested search terms (e.g., Help, Hello, Henry, etc.) and returns those suggested search terms to user interface module 702. User interface module 702 displays these newly suggested search terms as part of the system level search UI. This process can continue until the user selects an application to search for the search term that he or she has entered.

Although the suggested search terms are discussed herein as being text search terms, various other content and/or types of content can be returned to user interface module 702. This other content and/or types of content can be displayed or otherwise presented by user interface module 702 in addition to, or alternatively in place of, the returned suggested search terms. For example, one or more images related to one or more suggested search terms can be returned and displayed, additional descriptive text related to one or more suggested search terms can be returned and displayed, audio content related to one or more suggested search terms can be returned and played back, and so forth.

Figure 9:
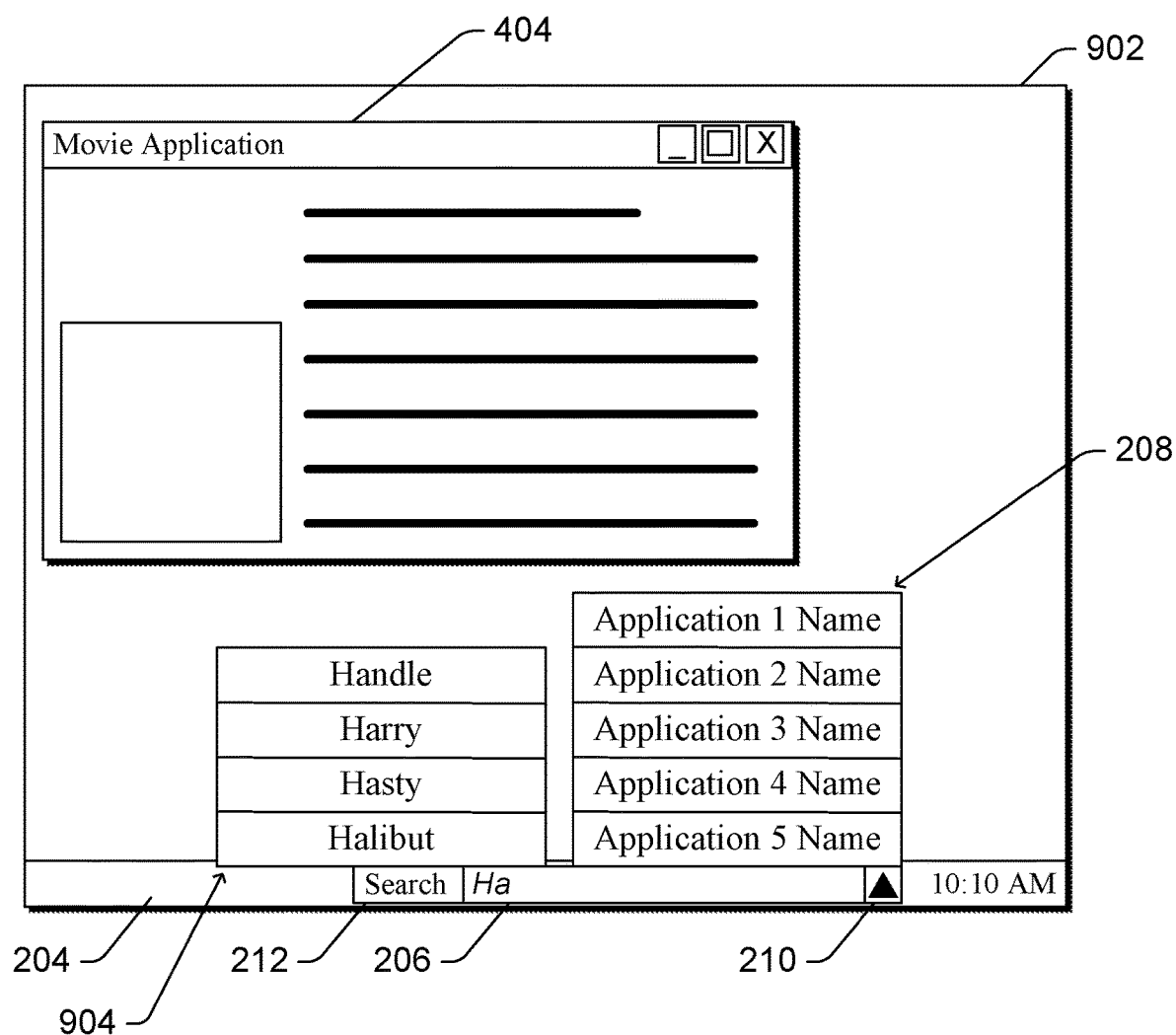
FIG. 9 illustrates another example screen display including a system level search user interface in accordance with one or more embodiments.

FIG. 9 illustrates another example screen display 902 including a system level search user interface in accordance with one or more embodiments. Screen display 902 is similar to screen display 402 of FIG. 4. However, screen display 902 also displays multiple suggested search terms as suggestion list 904. In the illustrated example, the user has entered the characters "Ha", and the currently active application has provided suggested search terms of Handle, Harry, Hasty, and Halibut. Suggestion list 904 is illustrated as being above and adjacent to data input portion 206. However, it is to be appreciated that suggestion list 904 can be displayed anywhere on screen display 202 (although typically so as not covering data input portion 206, application identification portion 208, search button 212, or menu icon 210). For example, suggestion list 904 can be displayed at the top of screen display 902, along the left side or right side of screen display 902, in the center of screen display 902, in locations not adjacent to data input portion 206, and so forth.

Returning to FIG. 7, in one or more embodiments user interface module 702 can also display, for each of one or more applications identified in the application identification portion, one or more search results. User interface module 702 can provide a search term entered by the user and sent to an application for searching (e.g., in response to user selection of a search button, such as search button 212 of FIGS. 2-6 and 9, or selection of another application in the application identification portion) to each of one or more applications identified in the application identification portion, and those one or more applications can each return one or more search results based on the search term to module 702. User interface module 702 can then display those one or more search results in the application identification portion as associated with the application that returned the search results (e.g., adjacent to and below an identifier of the application, adjacent to and above the identifier of the application, with an icon or text identifying the application, and so forth). Thus, the user can be given a preview of the results that applications in the application identification portion would return if the user were to select that application.

Alternatively, user interface module 702 can, in addition to or in place of providing to each of one or more applications identified in the application identification portion a search term entered by the user and sent to an application for searching, provide user input as it is received to each of one or more applications identified in the application identification portion. Each of those one or more applications can return one or more search results based on the user input received, and can each return one or more search results based on the search term to module 702. User interface module 702 can then display those one or more search results in the application identification portion as associated with the application that returned the search results as discussed above.

Additionally, in one or more embodiments user interface module 702 supports displaying suggested search terms with linguistic alternatives for certain languages. Some languages, such as East Asian languages (e.g., Japanese, Chinese, and Korean) are made up of numerous characters that do not correspond to individual keys of a keyboard. Other languages, such as Russian, can be represented using multiple different alphabets (e.g., Latin or Cyrillic in the case of Russian). User interface module 702 supports displaying search terms with linguistic alternatives for such languages.

Figure 10:
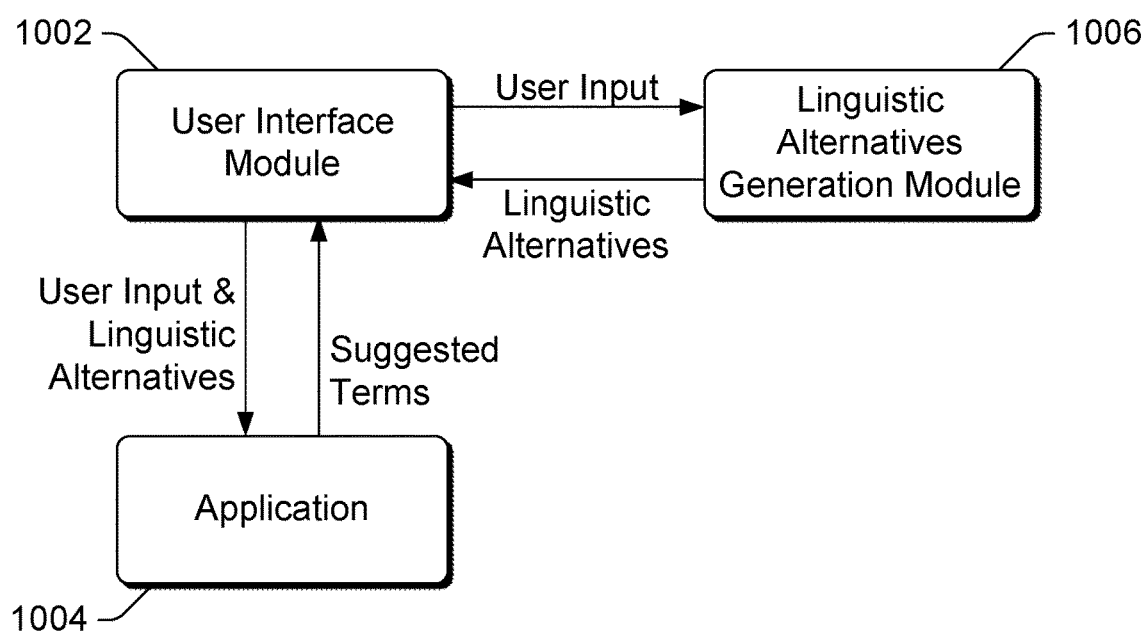
FIG. 10 is a block diagram illustrating an example system supporting linguistic alternatives for suggested search terms in accordance with one or more embodiments.

FIG. 10 is a block diagram illustrating an example system 1000 supporting linguistic alternatives for suggested search terms in accordance with one or more embodiments. System 1000 includes a user interface module 1002, an application 1004, and a linguistic alternatives generation module 1006. User interface module 1002 can be, for example, a user interface module 702 of FIG. 7. Application 1004 can be, for example, an application 112 of FIG. 1.

As user interface module 1002 receives user inputs, module 1002 provides the user input as it is received to linguistic alternatives generation module 1006. Linguistic alternatives generation module 1006 can identify linguistic alternatives for user inputs in a variety of different manners, and returns those linguistic alternatives to user interface module 1002. Linguistic alternatives generation module 1006 typically identifies one or more linguistic alternatives for user inputs, and returns those one or more linguistic alternatives to user interface module 1002. It should be noted, however, that linguistic alternatives generation module 1006 typically is not (however alternatively could be) required to return linguistic alternatives. Accordingly, situations can arise in which linguistic alternatives generation module 1006 identifies and returns no linguistic alternatives for particular user input.

In one or more embodiments, linguistic alternatives generation module 1006 identifies linguistic alternatives for a user input by translating the user input from one alphabet into another. For example, in the case of the Russian language, if the user input is Latin alphabet characters then linguistic alternatives generation module 1006 translates the Latin alphabet characters into Cyrillic alphabet characters. Linguistic alternatives generation module 1006 returns the translation of the user input (in Cyrillic alphabet characters) as one or more linguistic alternatives.

Additionally, in one or more embodiments linguistic alternatives generation module 1006 identifies one or more characters that can be represented by a phonetic syllable. In some situations, such as some East Asian languages, in order to enter a particular character a user inputs a phonetic syllable as multiple Latin alphabet characters. For example, the user may input a phonetic syllable using the Latin alphabet characters "bei", which can correspond to multiple different Chinese characters. Linguistic alternatives generation module 1006 identifies zero or more different characters that can correspond to a particular user input, and returns those identified characters to user interface module 1002 as linguistic alternatives. For example, if the user input were "bei", then linguistic alternatives generation module 1006 identifies the different Chinese characters that could be represented by "bei" and returns those Chinese characters to user interface module 1002 as linguistic alternatives. By way of another example, if the user input were "h", then linguistic alternatives generation module 1006 identifies the different Chinese characters that could be represented by "h" (which would include multiple different phonetic syllables beginning with "h") and returns those Chinese characters to user interface module 1002 as linguistic alternatives.

Linguistic alternatives generation module 1006 can be configured for particular languages or alternatively for multiple languages. For example, a configuration setting identifying the languages for which linguistic alternatives generation module 1006 is to provide alternatives can be provided by a user of the computing device that includes system 1000, by application 1004, by user interface module 1002, and so forth. By way of another example, different linguistic alternatives generation modules 1006 can be included in system 1000, each for a different language (e.g., one module 1006 for Russian, another module 1006 for Chinese, another module 1006 for Japanese, etc.). User interface module 1002 can provide the user input to one or more of these different modules 1006 depending on the languages for which linguistic alternatives are desired (e.g., as indicated by a user of the computing device that includes system 1000, by application 1004, by user interface module 1002, and so forth).

User interface module 1002 receives the linguistic alternatives from linguistic alternatives generation module 1006 and provides both the user input and the linguistic alternatives to the application 1004. If no linguistic alternatives are received from linguistic alternatives generation module 1006, then user interface module 1002 provides just the user input to the application 1004. Application 1004 can then determine zero or more suggested search terms based on the user input, the linguistic alternatives, or both the user input and the linguistic alternatives. The application 1004 itself determines the particular combination of the user input and the linguistic alternatives on which the determination of suggested search terms is based. The suggested search terms are returned to user interface module 1002, which displays the suggested search terms as part of the system level search UI. As the suggested search terms can be based on the linguistic alternatives, the suggested search terms can be in various different alphabets and/or languages. For example, the suggested search terms may include English language words that begin with "bei", as well as Chinese characters that are represented by "bei".

Returning to FIG. 7, in addition to providing suggested search terms, or alternatively in place of providing suggested search terms, the currently active application can provide search results as each character or other symbol is entered by the user. The currently active application generates search results based on the characters or other symbols entered by the user, and uses those characters or symbols as the search term (even though the user may not yet have fully entered what he or she desires as the search term). These search results are displayed by the currently active application (e.g., in window 404 of FIG. 5), and can be updated by the currently active application each time an additional character or symbol is entered by the user.

Additionally, in one or more embodiments, the currently active application optionally provides a data input cue to user interface module 702. This data input cue can be helper text, images, animations, and so forth to assist the user. For example, the data input cue can be the text "Input search term here" or "Enter movie title here". If provided by the currently active application, the data input cue is displayed by user interface module 702 to assist the user in determining where he or she can input a search term. The data input cue can be displayed in the data input portion of the system level search UI (e.g., and display of the data input cue can cease when the user enters a first character or symbol), or alternatively in another location such as adjacent to the data input portion of the system level search UI.

The communication between the currently active application and user interface module 702 can be implemented in a variety of different manners. In one or more embodiments, each application creates a class object that facilitates communications between that application and user interface module 702. The class object created by an application enables the application to receive communications (e.g., user inputs) from, and provide data (e.g., data input cue, suggested search term) to, user interface module 702. User interface module 702 communicates data to only the class object of the currently active application, and accepts communications from only the class object of the currently active application. Alternatively, communication between the currently active application and user interface module 702 can be implemented in other conventional manners other than using such a class object, such as implementing an interface between user interface module 702 and the applications, user interface module 702 exposing an API that can be invoked by the applications, and so forth.

Figure 11:
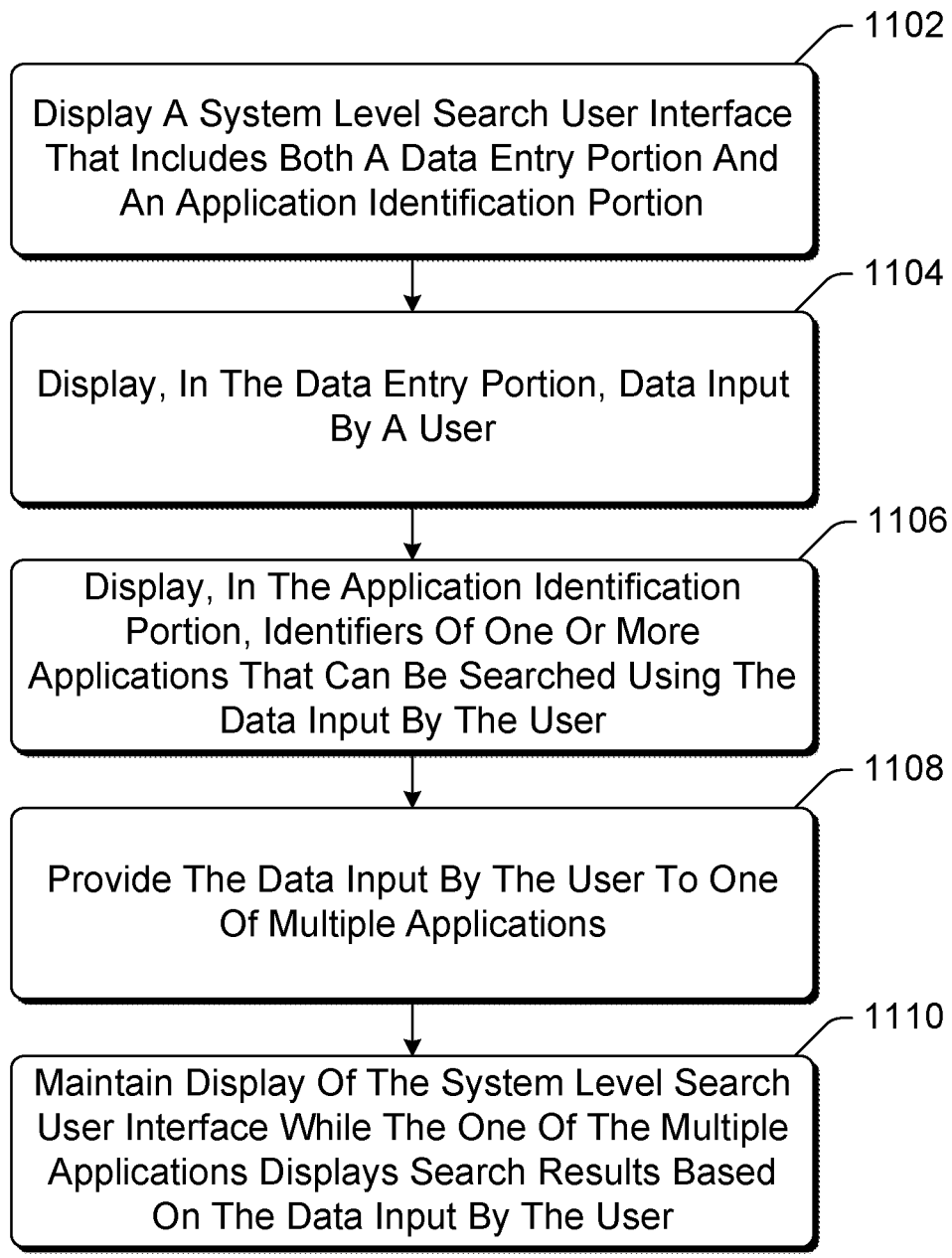
FIG. 11 is a flowchart illustrating an example process for using a system level search user interface in accordance with one or more embodiments.

FIG. 11 is a flowchart illustrating an example process 1100 for using a system level search user interface in accordance with one or more embodiments. Process 1100 is carried out by a system level search module, such as system level search module 700 of FIG. 7, and can be implemented in software, firmware, hardware, or combinations thereof. Process 1100 is shown as a set of acts and is not limited to the order shown for performing the operations of the various acts. Process 1100 is an example process for using a system level search user interface; additional discussions of using a system level search user interface are included herein with reference to different figures.

In process 1100, a system level search UI is displayed that includes both a data entry portion and an application identification portion (act 1102). The system level search UI can be displayed in a variety of different locations on a screen display as discussed above.

Data that is input by a user is displayed in the data entry portion of the system level search UI (act 1104). Data can be input by the user in a variety of different manners as discussed above.

Identifiers of one or more applications that can be searched using the data input by the user are displayed in the application identification portion (act 1106). These identifiers can take a variety of different forms, such as names, icons, animations, and so forth as discussed above. The identifiers displayed in act 1106 are identifiers of one or more applications that have registered for use with the system level search UI, and can be selected in different manners as discussed above.

The data input by the user is provided to one of multiple applications on the device implementing the system level search UI (act 1108). As discussed above, the data input can be provided to a currently active application (e.g., by selection of a search button as discussed above), or to an application corresponding to an application identifier that is displayed in the application identification portion and selected by the user.

The system level search UI display is maintained while the application to which the data input by the user is provided obtains and displays search results based on the data input by the user (act 1110). The application manages display of the search results (e.g., in a window of the application) as discussed above, while the system level search UI remains displayed.

Figure 12:
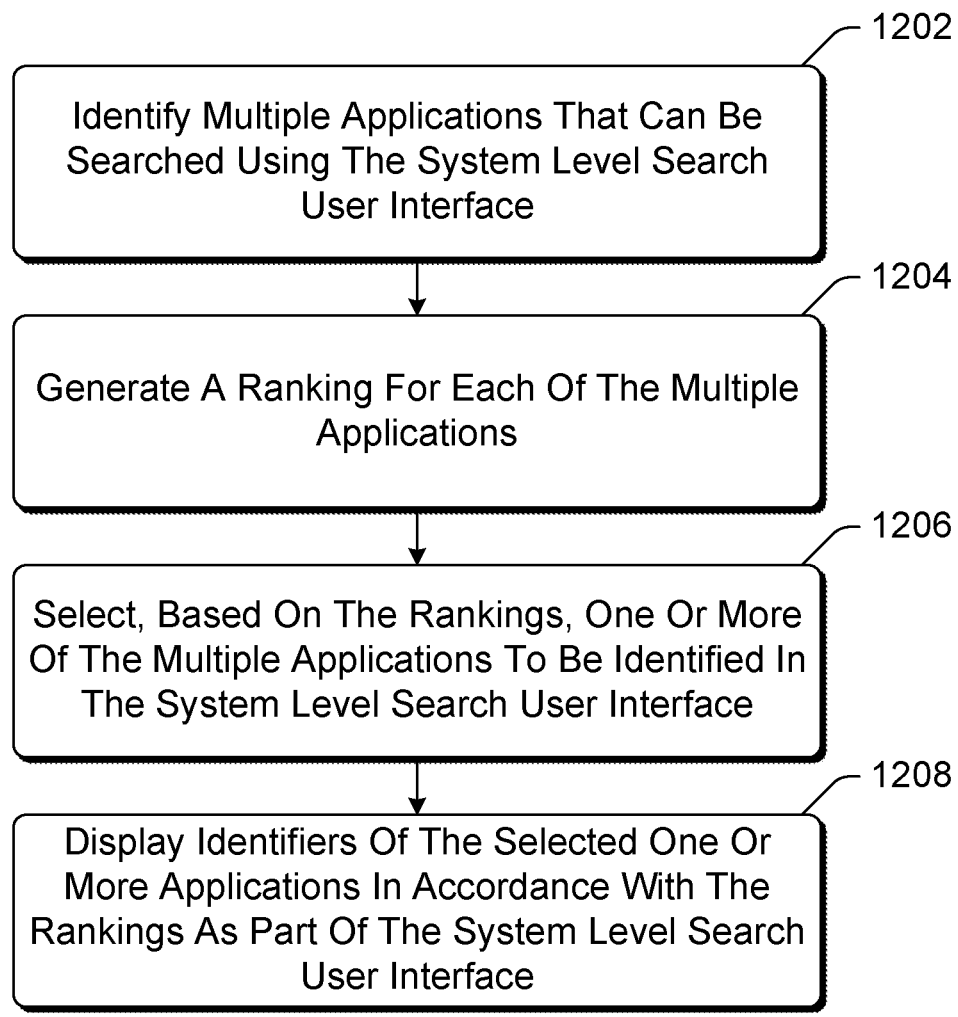
FIG. 12 is a flowchart illustrating an example process for displaying application identifiers in an application identification portion of a system level search user interface in accordance with one or more embodiments.

FIG. 12 is a flowchart illustrating an example process 1200 for displaying application identifiers in an application identification portion of a system level search user interface in accordance with one or more embodiments. Process 1200 is carried out by a system level search module, such as system level search module 700 of FIG. 7, and can be implemented in software, firmware, hardware, or combinations thereof. Process 1200 is shown as a set of acts and is not limited to the order shown for performing the operations of the various acts. Process 1200 is an example process for displaying application identifiers in an application identification portion of a system level search user interface; additional discussions of displaying application identifiers in an application identification portion of a system level search user interface are included herein with reference to different figures.

In process 1200, multiple applications that can be searched using the system level search UI are identified (act 1202). These multiple applications are applications that have registered to use the system level search UI as discussed above.

A ranking is generated for each of the multiple applications (act 1204). These rankings can be generated in a variety of different manners, as discussed above, including optionally using user-specified rankings. These rankings can be, for example, a particular score or an ordering of the applications from highest to lowest as discussed above.

One or more of the multiple applications that are to be identified in the system level search UI are selected based at least in part on the rankings (act 1206). If there are more applications than can be identified in the system level search UI, then one or more of the applications are selected based on their rankings as discussed above.

Identifiers of the selected one or more applications are displayed in accordance with the rankings as part of the system level search UI (act 1208). The manner in which the application identifiers are displayed in accordance with their rankings can vary by implementation as discussed above, such as displaying application identifiers top to bottom in order from highest ranking (at the top) to lowest ranking (at the bottom), from left to right in order from highest ranking (at the left) to lowest ranking (at the right), and so forth.

It should be noted that any of a variety of different types of information can be searched for by a user, such as contact information for other users, movies, games, books or other publications, and so forth. Additionally, in one or more embodiments, one of the applications that registers with the system level search UI is an application or module that indexes applications on the computing device. For example, one of the applications 112 of FIG. 1 can be an application that can search for other applications 112 on computing device 102. Thus, the user can search for other applications 112, as well as the content maintained or otherwise accessible via those applications 112.

In the discussions herein, reference is made to launching a user selected application and the selected application searching for the search term. It should be noted that situations can arise where the selected application is already running (e.g., in the background), and thus does not need launching. In such situations, the system level search module (e.g., module 700 of FIG. 7) communicates a request to the selected application to search for the search term. In response, the selected application searches for the search term and displays its search results. In one or more embodiments the application includes, as part of the registration information it provides to the system level search module, an indication of how the system level search module is to request that the application search for the search term. For example the registration information can include an indication of one or more APIs of the application to invoke in order to pass the application the search term (and optionally other context information). Alternatively other techniques can be used, such as when the application begins running the application can notify the system level search module of how the system level search module can request that the application search for the search term, the system level search module can communicate the request via a pre-established communication channel or following a protocol known to both the application and the system level search module, and so forth.

The system level search UI discussed herein allows the user to enter the search term once and select different applications to be searched for that search term as discussed above. Each individual application performs its own searching, and need have no knowledge of (and typically has no knowledge of) other applications that may be selected by the user for searching. The manner in which an application performs its searching, as well as the data stores accessed by the application in performing its search, can vary by application. The application can search local data stores (data stores located on the same computing device as implements the system level search UI), and/or remote data stores (e.g., data stores located on another computing device, such as a device 104 of FIG. 1).

The search results generated by the applications are displayed by the application generating those search results. The search results are typically (but need not be) displayed in a separate window, such as window 404 of FIG. 5 or window 604 of FIG. 6. Each application is thus able to customize the display of its search results in any manner that it desires. Despite these different displays and/or different windows for search results, however, the data entry portion and application identification portion of the system level search UI remain the same. The system level search UI is maintained in the same location, and the appearance does not alter based on the search results (although a data input cue and suggested search terms may change based on the currently active application as discussed above).

Figure 13:
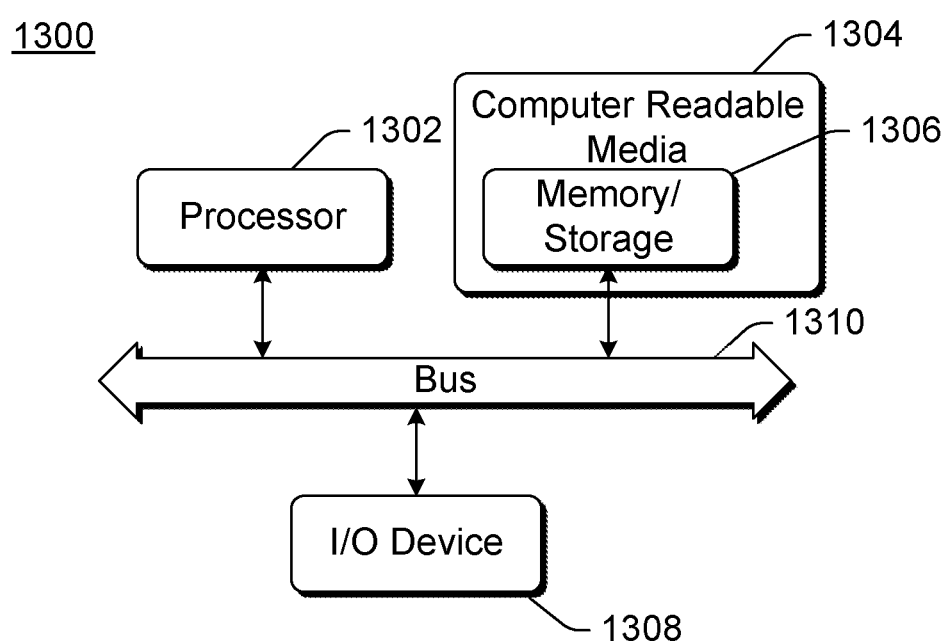
FIG. 13 illustrates an example computing device that can be configured to implement the registration for system level search user interface in accordance with one or more embodiments.

FIG. 13 illustrates an example computing device 1300 that can be configured to implement the registration for system level search user interface in accordance with one or more embodiments. Computing device 1300 can be, for example, computing device 102 or 104 of FIG. 1.

Computing device 1300 includes one or more processors or processing units 1302, one or more computer readable media 1304 which can include one or more memory and/or storage components 1306, one or more input/output (I/O) devices 1308, and a bus 1310 that allows the various components and devices to communicate with one another. Computer readable media 1304 and/or one or more I/O devices 1308 can be included as part of, or alternatively may be coupled to, computing device 1300. Bus 1310 represents one or more of several types of bus structures, including a memory bus or memory controller, a peripheral bus, an accelerated graphics port, a processor or local bus, and so forth using a variety of different bus architectures. Bus 1310 can include wired and/or wireless buses.

Memory/storage component 1306 represents one or more computer storage media. Component 1306 can include volatile media (such as random access memory (RAM)) and/or nonvolatile media (such as read only memory (ROM), Flash memory, optical disks, magnetic disks, and so forth). Component 1306 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 1302. It is to be appreciated that different instructions can be stored in different components of computing device 1300, such as in a processing unit 1302, in various cache memories of a processing unit 1302, in other cache memories of device 1300 (not shown), on other computer readable media, and so forth. Additionally, it is to be appreciated that the location where instructions are stored in computing device 1300 can change over time.

One or more input/output devices 1308 allow a user to enter commands and information to computing device 1300, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 13. The features of the registration for system level search user interface techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by an operating system of a computing device, the method comprising:
   at a first time, registering a particular application by the operating system, wherein the particular application is installed locally on the computing device with the operating system and the particular application is configured to provide a plurality of search terms for searching the particular application;
   at a second time subsequent to the first time when the particular application is registered by the operating system:
      receiving one or more characters via a search interface provided by the operating system, the search interface being displayed on the computing device;
      obtaining, by the operating system, one or more suggested search terms from the plurality of search terms provided by the particular application, the one or more suggested search terms being based at least on the one or more characters;
      displaying, by the operating system, the one or more suggested search terms provided by the particular application in the search interface; and
      responsive to user input selecting a particular suggested search term via the search interface, providing the particular suggested search term from the operating system to the particular application.

2. The method of claim 1, further comprising:
   obtaining and displaying further suggested search terms as additional characters are received via the search interface.

3. The method of claim 1, further comprising:
   storing the plurality of search terms in an index; and
   retrieving the one or more suggested search terms from the index responsive to receiving the one or more characters via the search interface.

4. The method of claim 1, further comprising:
   responsive to the user input selecting the particular suggested search term, populating a data entry portion of the search interface with the particular suggested search term.

5. The method of claim 4, further comprising:
   receiving further user input selecting a search button while the data entry portion of the search interface is populated with the particular suggested search term.

6. The method of claim 1, further comprising:
   obtaining one or more images relating to the one or more suggested search terms; and
   displaying the one or more images with the one or more suggested search terms.

7. The method of claim 1, further comprising:
   obtaining audio content relating to the one or more suggested search terms; and
   playing back the audio content when displaying the one or more suggested search terms.

8. A computing device, comprising:
   one or more processors; and
   one or more hardware computer storage media having stored thereon multiple instructions that, when executed by the one or more processors, cause an operating system of the computing device to:
   at a first time, register a particular application, wherein the particular application is installed locally on the computing device with the operating system and the particular application is configured to provide a plurality of search terms for searching the particular application; and
   at a second time subsequent to the first time when the particular application is registered by the operating system, receive one or more characters via a search interface provided by the operating system, the search interface being displayed on the computing device;
   obtain, by the operating system, one or more suggested search terms from the plurality of search terms provided by the particular application, the one or more suggested search terms being based at least on the one or more characters;
   display, by the operating system, the one or more suggested search terms provided by the particular application in the search interface; and
   based at least on user input selecting a particular suggested search term via the search interface, provide the particular suggested search term from the operating system to the particular application.

9. The computing device of claim 8, wherein the multiple instructions, when executed by the one or more processors, cause the operating system of the computing device to:

obtain and display further suggested search terms as additional characters are received via the search interface.

10. The computing device of claim 8, wherein the multiple instructions, when executed by the one or more processors, cause the operating system of the computing device to:

store the plurality of search terms in an index; and
retrieve the one or more suggested search terms from the index responsive to receiving the one or more characters via the search interface.

11. The computing device of claim 8, wherein the multiple instructions, when executed by the one or more processors, cause the operating system of the computing device to:

responsive to the user input selecting the particular suggested search term, populate a data entry portion of the search interface with the particular suggested search term.

12. The computing device of claim 11, wherein the multiple instructions, when executed by the one or more processors, cause the operating system of the computing device to:

receive further user input selecting a search button while the data entry portion of the search interface is populated with the particular suggested search term.

13. The computing device of claim 12, wherein the multiple instructions, when executed by the one or more processors, cause the operating system of the computing device to:

provide the particular suggested search term to the particular application responsive to the further user input.

14. The computing device of claim 8, wherein the multiple instructions, when executed by the one or more processors, cause the operating system of the computing device to:

obtain one or more images relating to the one or more suggested search terms; and
display the one or more images with the one or more suggested search terms.

15. The computing device of claim 8, wherein the multiple instructions, when executed by the one or more processors, cause the operating system of the computing device to:

obtain descriptive text relating to the one or more suggested search terms; and
display the descriptive text with the one or more suggested search terms.

16. One or more hardware computer storage media having stored thereon multiple instructions that, when executed by one or more processors of a computing device, cause the one or more processors to implement an operating system configured to:

at a first time, register a particular application by the operating system, wherein the particular application is installed locally on the computing device with the operating system and the particular application is configured to provide a plurality of search terms for searching the particular application;
at a second time subsequent to the first time when the particular application is registered by the operating system, receive one or more characters via a search interface provided by the operating system, the search interface being displayed on the computing device;
obtain, by the operating system, one or more suggested search terms from the plurality of search terms provided by the particular application, the one or more suggested search terms being based at least on the one or more characters;
display, by the operating system, the one or more suggested search terms provided by the particular application in the search interface; and
based at least on user input selecting a particular suggested search term via the search interface, provide the particular suggested search term from the operating system to the particular application.

17. The one or more hardware computer storage media of claim 16, wherein the user input comprises multiple user inputs.

18. The one or more hardware computer storage media of claim 16, wherein each of the one or more suggested search terms begins with the one or more characters received via the search interface provided by the operating system.

19. The one or more hardware computer storage media of claim 16, wherein the one or more suggested search terms are obtained from an index.

20. The one or more hardware computer storage media of claim 16, wherein the particular application is running when the one or more characters are received via the search interface provided by the operating system.

* * * * *